May 30, 1933.   F. G. HENRY   1,911,688
FLEXIBLE COUPLING
Filed Oct. 26, 1931   2 Sheets-Sheet 1

INVENTOR.
Ferdinand G. Henry

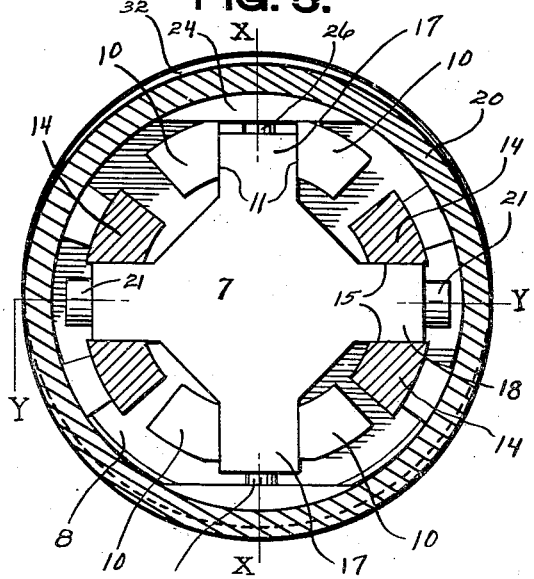
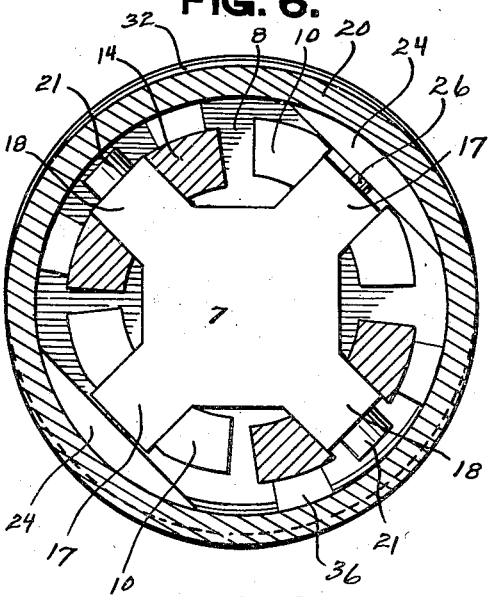
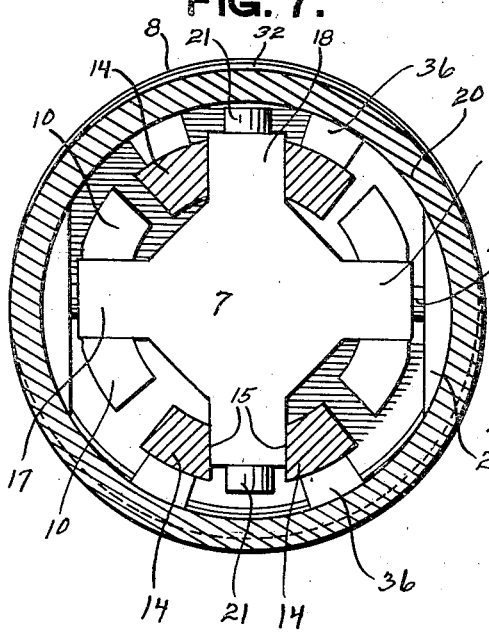
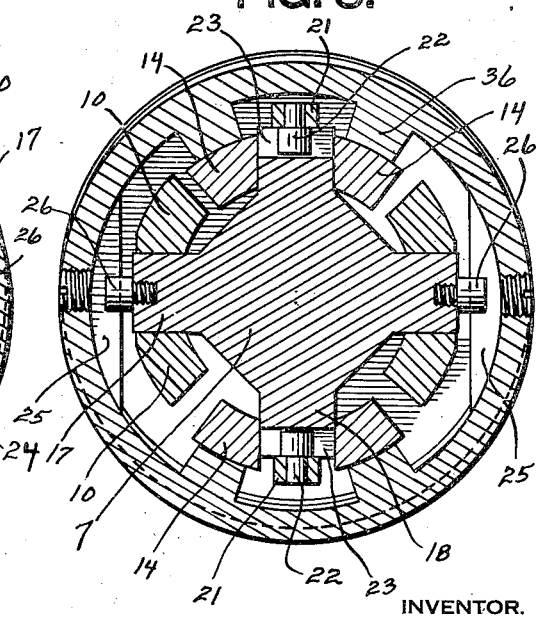

Patented May 30, 1933

1,911,688

UNITED STATES PATENT OFFICE

FERDINAND G. HENRY, OF MOLINE, ILLINOIS

FLEXIBLE COUPLING

Application filed October 26, 1931. Serial No. 571,231.

The present invention relates to universal couplings and the primary object of the invention is to provide an improved drive coupling device for rotating shafts permitting relative angular, radial and lateral or longitudinal movement of the shafts to compensate for any angular or axial misalignment of the shafts as well as permitting relative longitudinal movement of the shafts without effecting the rotative relation of the shafts.

A further object of the invention is to provide a universal coupling of this character wherein a positive and unyielding drive will be had between two shafts in either direction to prevent any back lash or lost motion between the shafts and yet providing flexibility and absolute freedom of movement to compensate for any angular disposition between the shafts, axial misalignment between two parallel shafts, and permitting lateral or longitudinal motion of one or both of the shafts; said coupling accomplishing the foregoing without placing any stresses or strains upon the bearings supporting the shafts.

A further object of the invention is to provide a universal flexible coupling of this character embodying a novel arrangement whereby the driving elements of the coupling are contained in an oil tight enclosure formed without the use of resilient packing or sealing means.

Other objects and advantages of the invention will be apparent during the course of the following detailed description, taken in connection with the accompanying drawings, forming a part of this specification and in which drawings:—

Figure 5 is a section on the line 5—5 of Figure 2.

Figure 6 is a view similar to Figure 5 but showing the coupling rotated for one-eighth of a turn from the showing in Figure 5.

Figures 7 and 8 are sections on the respective lines in Figure 4.

Figure 1:
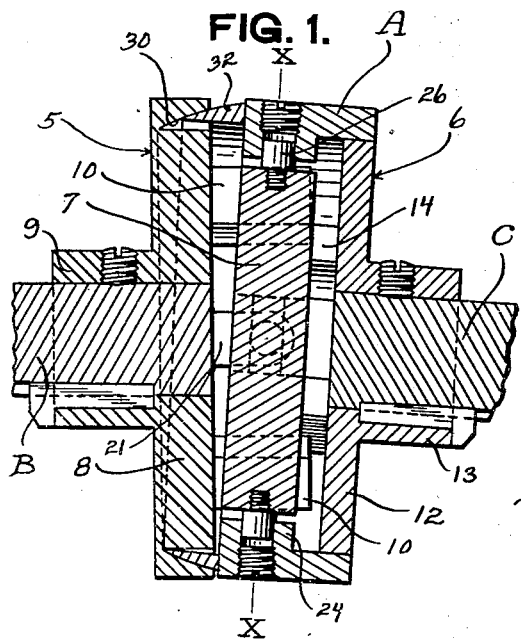
Figure 1 is a section taken diametrically thru the coupling shown connecting two shafts arranged in angular relation.

In the drawings and wherein similar reference characters designate corresponding parts throughout the several views, the universal flexible coupling A has been shown connecting the extremities of two rotary shafts B and C and for the purpose of explanation, the shaft B may be termed the driving shaft while the shaft C may be termed the driven shaft. It is to be understood however, that either of the shafts B or C may constitute the driving shaft.

The coupling A comprises a pair of coupling members 5 and 6 having arranged therebetween a driving member 7 so associated with the members 5 and 6 as to permit angular and axial misalignment of the shafts B and C as well as lateral or relative axial movement of the shafts and yet providing a positive and unyielding drive between the shafts.

Figure 2:
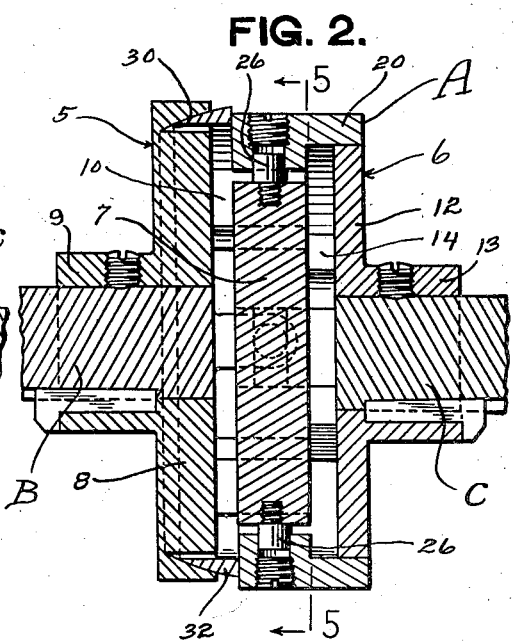
Figure 2 is a sectional view showing the coupling connecting two shafts having their axes in parallel offset relation.

The coupling member 5 comprises a disc portion 8 provided with an axially disposed hub 9 adapted to receive the shaft B and secured thereto as by a key or set screw or both as clearly shown in Figures 1 and 2. Preferably formed integral with and projecting inwardly from the inner face of the disc 8 and parallel to the axis of the disc are two pairs of driving lugs 10 of substantially segmental shape. Each set of driving lugs provides parallel flat confronting faces 11 with the faces of one set of lugs in a like plane as the faces of the companion set of lugs. These driving lugs 10 as will be observed in Figures 5 to 8 are arranged concentric to the disc 8 and spaced inwardly from the peripheral edge of the disc.

The coupling member 6 is formed with a disc 12 having an axially disposed hub 13 for attachment to the shaft C as by a suitable set screw or key or both as shown in Figures 1 and 2. Preferably formed integral with and projecting inwardly from the flat inner face of the disc 12 are two sets of driving lugs 14 of substantially segmental shape in cross section and provided with flat parallel confronting faces 15. These driving lugs 14 extend parallel to the axis of the hub 13 and when the members 5 and 6 are in assembled relation are arranged between the sets of driving lugs 10 with the faces 15 of the lugs 14 in right angular relation to the faces 11 of the driving lugs 10. As will be observed in Figures 5 to 8, the driving lugs 10 and 14 are of such size as to provide a spacing between the sets of lugs and each coupling member 5 and 6. This spacing prevents contact of the sets of lugs and prevents binding of the lugs during operation of the coupling.

Figure 3:
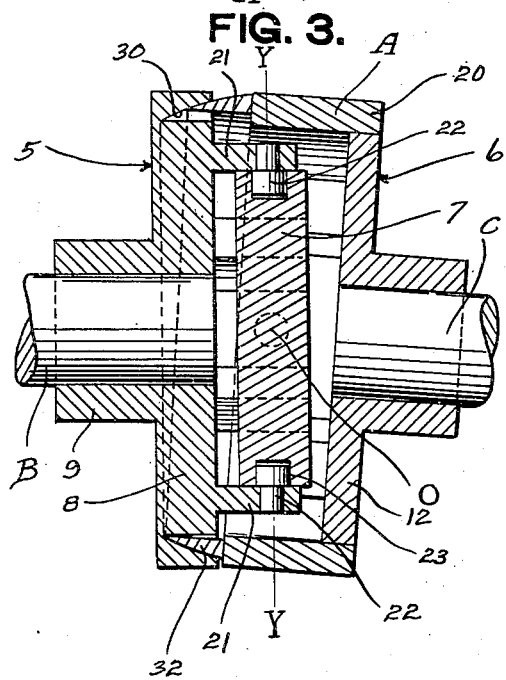
Figure 3 is a sectional view similar to Figure 1 but showing the coupling rotated for a one-quarter turn.
Figure 4:
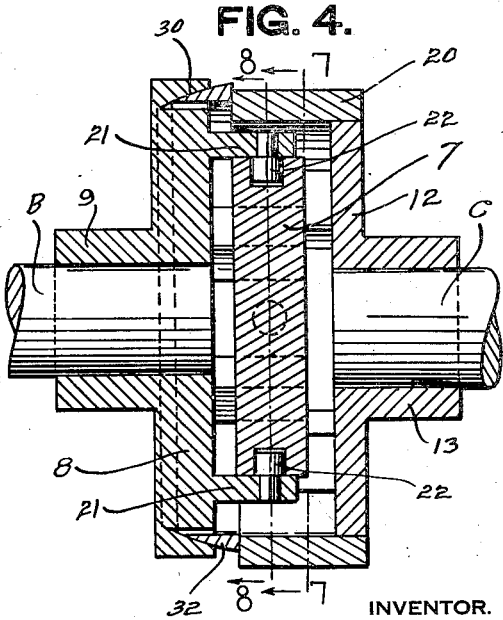
Figure 4 is a view similar to Figure 2 but showing the coupling having been rotated for a one-quarter turn.

The driving member 7 is in the form of a cross providing sets of radially extending arms 17 and 18 which are respectively arranged between the sets of driving lugs 10 and 14. The cross arms 17 and 18 are rectangular shape in cross section providing flat faces for sliding surface contact with the confronting or bearing faces of the driving lugs with which they co-act. Thus, referring particularly to Figure 5 it will be seen that the driving member 7 will have sliding contact with the driving lugs 10 in the direction of the axis X—X and sliding movement on the axis Y—Y in the driving lugs 14. The driving member 7 is also permitted to rotate about the axis X—X and also about the axis Y—Y reference being had to Figures 1 and 3.

The structure thus far described, when assembled between the ends of two shafts, provides a positive and unyielding drive between the shafts and provides flexibility and absolute freedom of movement of the shafts to compensate for any angular disposition between the shafts, axial misalignment between two parallel shafts and also permits lateral or longitudinal motion of one or both of the shafts. With this universal drive coupling however, the driving elements of the coupling would be exposed and difficulty would be encountered in properly lubricating the driving elements. I have therefore incorporated with my improved universal coupling, a feature permitting the driving element to be employed in an oil tight chamber and yet permitting all angular, radial and relative longitudinal movement of the connected shafts without resorting to the use of yieldable packings of any sort.

To provide an enclosure for the driving element, a cylindrical member or sleeve 20 is provided and into the outer end of which the disc 12 of the coupling member 6 has a snug but free sliding fit. Preferably formed integral with the disc 8 to project into the sleeve 20 at the ends of the cross arms 18, are lugs 21 provided with pins 22 projecting into slots 23 provided in the ends of the arms 18. These pin and slot connections permit sliding movement of the driving member 7 in the direction of the axis X—X and permit rotation of the driving member on the axis Y—Y. Formed on the inner side of the sleeve 20 adjacent its inner end are pairs of diametrically disposed segmental shaped ribs 24 spaced apart to provide slots 25 adapted to receive pins 26 provided at the outer end of each cross arm 17. These pins 26 engaging in the slots 25 permit sliding movement of the sleeve 20 along the line Y—Y and pivotal movement of the sleeve about the axis X—X. The sleeve 20 thus being connected to the driving member 7 is also permitted to rotate about the axis Y—Y.

Formed in the inner face of the disc 8 concentrically thereof is a ring seat groove 30 providing a spherically formed seat for receiving the spherical surface of a sealing ring 32 having its outer end in sliding contact with the sleeve 20. This swivel seating of the ring 32 in the groove 30 provides an oil tight joint and permits angular changes between the sleeve 20 and disc 8. The sliding fit between the ring 32 and sleeve 20 provides an oil tight joint at this point and permits radial movement between the members 5 and 6.

The coupling of the driving member 7 to the coupling member 5 by the pins 22, and the coupling of the driving member to the sleeve 20 by the pins 26 holds the sleeve in contact with the sealing ring 32 and the sealing ring on its seat in the groove 30. Thus an oil tight enclosure is formed for the driving elements between the shafts B and C. The spherical surfaces of both the ring seat groove 30 and sealing ring 32 are generated from a common center O forming the intersection of the axes of the pins 22 and 26. This center O which is also intersected by the axis of the disc 8 remains at a fixed point with respect to the inner face of the disc 8 owing to the pin and slot connection of the driving member 7 to the disc.

It may here be well to note that no driving force whatever is transmitted thru the pins 22 or 26, the driving force being transmitted entirely by the engagement of the driving lugs 10 and 14 with the arms of the driving member 7. The pins 22 and 26 merely serve to retain the sleeve 20 and sealing ring 32 in proper relation to provide an oil tight chamber about the driving elements. It will also be noted that the coupling member 6 is free to move axially in the sleeve 20 to compensate for any relative longitudinal movement between the shafts B and C. The sleeve 20 is preferably provided at its inner side with suitably spaced slide lugs 36 to be engaged by the driving lugs 14 for aiding in holding the sleeve 20 co-axially of the disc 12.

Referring to Figures 1 and 2, it will be seen that this method of enclosing the driving elements of the coupling members 5 and 6 permits angular as well as axial misalignment of the shafts B and C owing to the swivel seating of the ring 32 in the disc 8 and the sliding fit between the sleeve 20 and the ring 32.

Owing to the arrangement and formation of the driving lugs 10 and 14 and the driving member 7, a positive and unyielding drive in either direction will be had with no back lash or lost motion between the coupling members.

Since the geometrical center O from which the spherical surfaces of both the groove 30 and ring 32 are generated lies at the intersection of axes X—X, Y—Y and the axis of the shaft B, the axis Y—Y will always pass thru the pins 22 even tho the driving member 7 has moved up or down along the axis X—X, and since also, irrespective of the fact that the coupling member 6 and sleeve 20 may have moved to one side or the other along the driving member on the pins 26, the axis X—X will always pass thru the pins 26 so that the axis of the shaft B will always intersect axes X—X and Y—Y at O. Therefore, no matter in what direction members 6 and 20 may move radially, angularly or laterally, the center O will always remain fixed with respect to the spherical surfaces of the ring 32 and its seat 30. The sleeve 20 is free to slide over the sealing ring 32 to accommodate radial misalignment of the shafts and when taking up angular differences, the coupling member 6 and its sleeve 20 will in effect, turn spherically about a constant and fixed center O, forcing the ring 32 into and out of the seat groove 30 to accommodate the angular disposition of the sleeve caused by the shafts being out of parallelism. It will be noted that at no time during rotation of the device is the contact broken between the sleeve 20 and ring 32, the ring being permitted to roll in its seat to compensate for any difference in parallelism between its face and the bearing face of the sleeve 20. Therefore, a closed chamber is formed for receiving a lubricant in which the driving elements operate.

While the device provides freedom of movement in all directions, it will be seen that a positive and non-yielding drive in either direction is provided thus allowing the device to be used to connect two shafts requiring accurate relative timing in their operation without destroying their mechanical relation and yet providing for accidental misalignment or even deliberate offsetting or angular disposition of the shafts to be connected. Thus, a full universal coupling providing positive and unyielding interlocked drive between two shafts is provided. Obviously, the construction of the coupling may be so proportioned as to permit either of a small or greater angular freedom between the shafts and thus providing an ideal means for driving or coupling two angular shafts as for instance, the drive to the rear axle of a motor vehicle or from engine to propeller of motor boats. The device will also find use as a floating chuck for holding reamers or drills in machining operations. The coupling may be easily inspected without disconnecting any of the parts, by simply drawing the coupling member 6 out of the sleeve 20 and out of engagement with the driving member 7.

Changes in the shape, size and arrangement of parts may be made to the form of invention herein shown and described, without departing from the spirit of the invention or the scope of the following claims.

I claim:

1. In a coupling for rotatably connecting a pair of axially offset shafts, a pair of coupling members for fixed attachment one to each of said shafts, sets of diametrically arranged spaced apart driving lugs provided on each coupling member with the sets of lugs on one coupling member interfitting between the sets of lugs on the companion coupling member, a driving member having right angularly arranged radially extending arms projecting between the driving lugs of each set and having limited sliding movement radially of the coupling members, and means connecting the driving member at the ends of one pair of arms to one of the coupling members.

2. In a coupling for rotatably connecting a pair of axially offset shafts, a pair of coupling members for fixed attachment one to each of said shafts, sets of diametrically arranged spaced apart driving lugs provided on each coupling member with the sets of lugs on one coupling member interfitting between the sets of lugs on the companion coupling member, a driving member having right angularly arranged radially extending arms projecting between the driving lugs of each set and having limited sliding movement radially of the coupling members, and means pivotally connecting the driving member at the ends of the two aligning arms to one coupling member, the other of said members having axial movement relative to the driving member.

3. In a coupling for rotatably connecting a pair of angularly offset shafts, a pair of coupling members for fixed attachment one to each of said shafts, sets of diametrically arranged spaced apart driving lugs provided on each coupling member with the sets of lugs on one coupling member interfitting between the sets of lugs on the companion coupling member, a driving member having right angularly arranged radially extending arms projecting between the driving lugs of each set and having limited sliding movement radially of the coupling members, and means connecting the driving member to one of the coupling members and permitting relative axial movement of the coupling members in the angularly offset positions of the shafts.

4. In a universal coupling, the combination of a pair of metallic coupling members for fixed attachment to the ends of two shafts to be rotatably connected, said coupling members having limited axial movement, a driving member between the coupling members and having limited sliding movement radially of the coupling members, and metallic closure members slidably contacting the coupling members and providing a closed chamber about the driving member and permitting angular and axial misalignment of the shafts and also relative axial movement of the shafts said closure members having sliding contact with one another in a plane fixed at a right angle to the axis of one of the coupling members in all relative positions of the coupling members.

5. In a universal coupling for rotating shafts, a pair of coupling members each provided with two sets of diametrically arranged spaced apart driving lugs, a driving member having right angularly arranged radially extending arms projecting between the driving lugs of each set and having limited sliding movement radially of the coupling members, a sleeve encircling the driving member and in which one of said coupling members has axial sliding movement, and a sealing ring having sliding contact with the inner edge of the sleeve and having a spherical seat in the companion coupling member to form a closed chamber about the driving member in all relative positions of the coupling members.

6. In a universal coupling for rotating shafts, a pair of coupling members each provided with two sets of diametrically arranged spaced apart driving lugs, a driving member having right angularly arranged radially extending arms projecting between the driving lugs of each set and having limited sliding movement radially of the coupling members, a sleeve slidably receiving one of the coupling members and encircling the driving member, means connecting the sleeve thru the driving member to the companion coupling member thru right angularly arranged axes on which the driving member pivots, and a sealing ring having sliding contact with the inner edge of the sleeve and having a spherical seat in said companion coupling member.

7. In a universal coupling for rotating shafts, a pair of coupling members each provided with two sets of diametrically arranged spaced apart driving lugs, a driving member having right angularly arranged radially extending arms projecting between the driving lugs of each set and having limited sliding movement radially of the coupling members, a sleeve slidably receiving one of the coupling members, means connecting the driving member at the ends of one pair of arms with a pin and slot connection to the sleeve, means connecting the ends of the other arms of the driving member with a pin and slot connection to the companion coupling member, and a sealing ring having sliding contact with the inner edge of the sleeve and having a spherical seat in the companion coupling member whereby the coupling members may have relative radial and angular movement.

8. In a universal coupling for rotating shafts, the combination of a drive coupling member embodying a disc portion and two sets of diametrically arranged spaced apart driving lugs projecting from the inner face of the disc, a driven coupling member embodying a disc and two sets of diametrically arranged spaced apart driving lugs projecting from the inner face of the disc for interfitting between the sets of lugs on the drive coupling member, a driving member having right angularly arranged radially extending arms projecting between the driving lugs of each set and having limited sliding movement radially of the coupling members, a sleeve slidably receiving the disc of the driven coupling member, a pin at the outer end of one pair of arms for engaging in internal slots provided in the sleeve, pivot lugs provided on the disc of the driving coupling member in right angular relation to the driving lugs thereof and each provided with a pin engaging in slots provided in the ends of the other arms of the driving member, and a sealing ring having sliding contact with the inner edge of the sleeve and having a spherical seat in the inner face of the disc of the driving coupling member.

9. In a universal coupling for rotating shafts, a drive coupling member having a disc portion, two sets of diametrically arranged spaced apart driving lugs projecting from the inner face of the disc, pivot lugs projecting from the inner face of the disc in right angular relation to the driving lugs, a driving member having right angularly arranged arms with one pair of diametrically arranged arms projecting between the driving lugs, the companion pair of diametrically aligning arms having slotted ends, a pin carried by each pivot lug and projecting into the slots to permit movement of the driving member radially of the disc, a sleeve provided internally with diametrically arranged slots, a pin carried by the outer end of each arm arranged between the driving lugs and fitting in the slots of said sleeve to permit lateral movement of the sleeve, said disc having an annular groove in its inner face provided with a spherical seat, a sealing ring having a spherical face for engagement on said seat and having sliding contact with the inner face of said sleeve, and a driven coupling member including a disc slidable axially into the sleeve and two sets of diametrically arranged spaced apart sliding lugs projecting inwardly from the disc for slidably receiving the slotted arms of said driving member.

10. In a universal coupling for rotating shafts, a pair of coupling members each provided with two sets of diametrically arranged spaced apart driving lugs, a driving member having right angularly arranged radially extending arms projecting between the driving lugs of each set and having limited sliding movement radially of the coupling members, a sleeve slidably receiving one of the coupling members and encircling the driving member, means connecting the sleeve with a pin and slot connection to the driving member, means connecting the driving member with a pin and socket connection to the companion coupling member, and a sealing ring slidably contacting the last mentioned coupling member and the sleeve providing a closed chamber for the driving member in all angular positions of the shafts.

FERDINAND G. HENRY.